Aug. 31, 1948.  E. B. CINTRON  2,448,354
MACHINE FOR CUTTING MEN'S HEELS
Filed Dec. 17, 1947  3 Sheets-Sheet 1
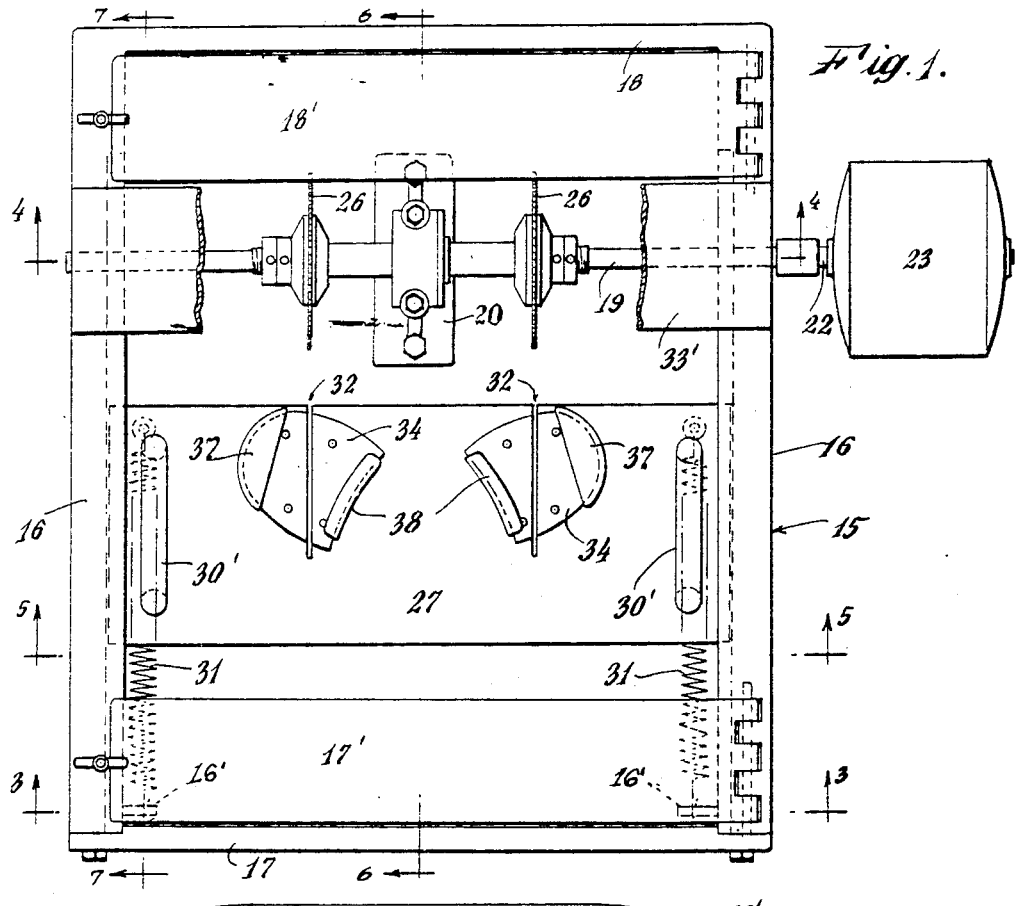
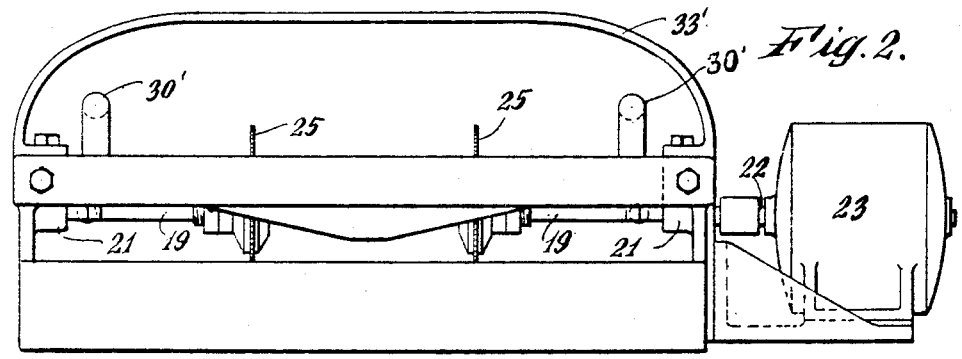
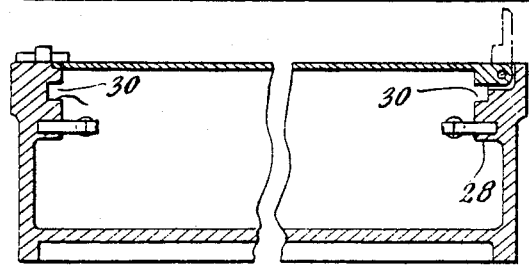
INVENTOR.
EZEQUIEL B. CINTRON
BY
Edw. S. Higgins
ATTORNEY.

Aug. 31, 1948. E. B. CINTRON 2,448,354
MACHINE FOR CUTTING MEN'S HEELS
Filed Dec. 17, 1947 3 Sheets-Sheet 2
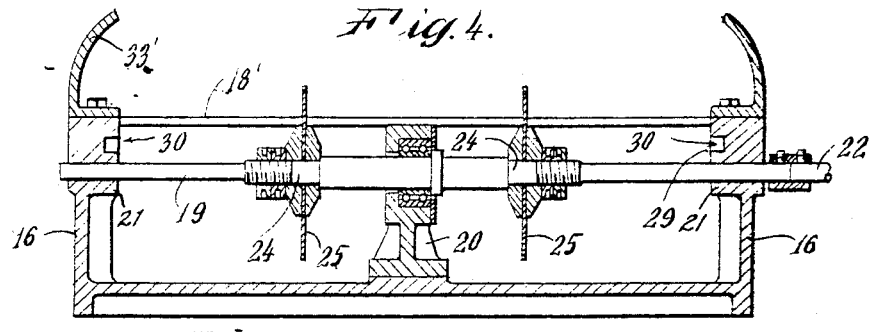
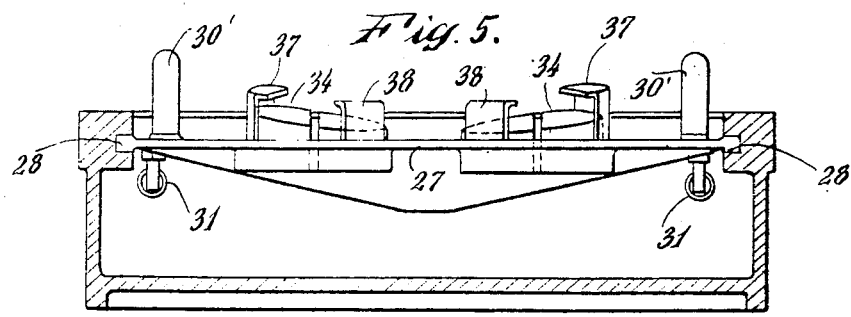
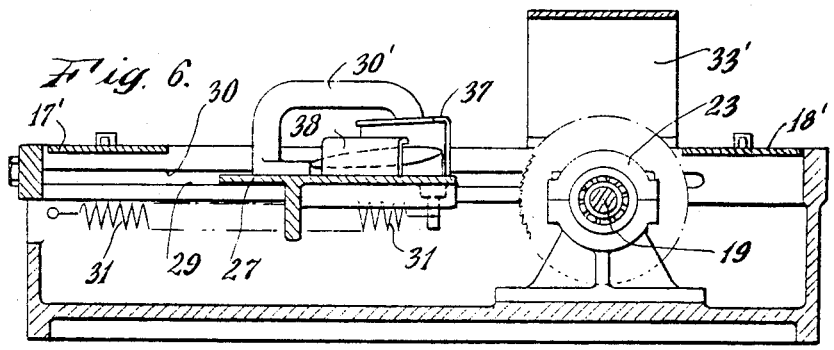
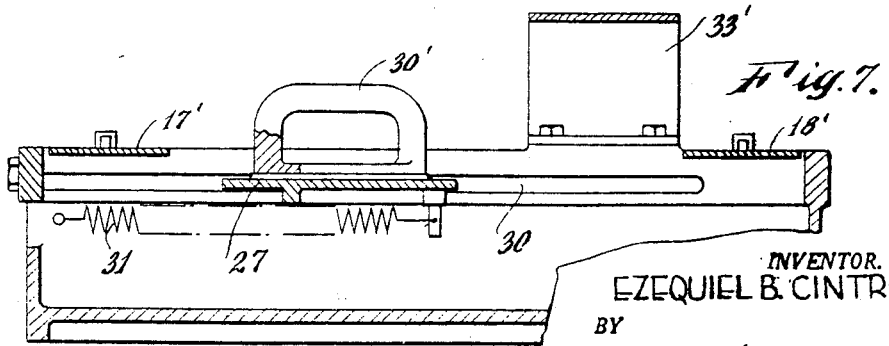
INVENTOR.
EZEQUIEL B. CINTRON
BY
Edw. S. Higgins
ATTORNEY.

Aug. 31, 1948.  E. B. CINTRON  2,448,354
MACHINE FOR CUTTING MEN'S HEELS
Filed Dec. 17, 1947  3 Sheets-Sheet 3
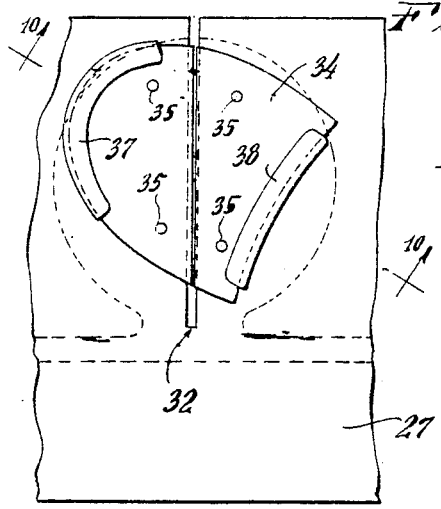
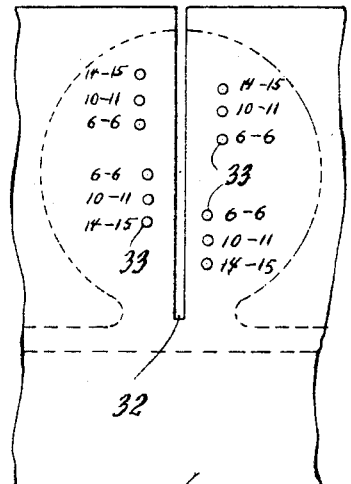
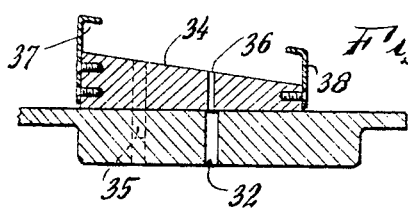
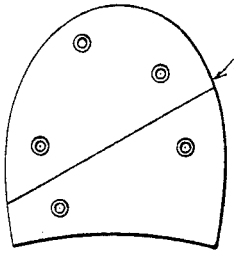
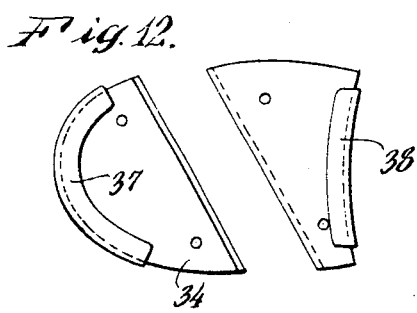
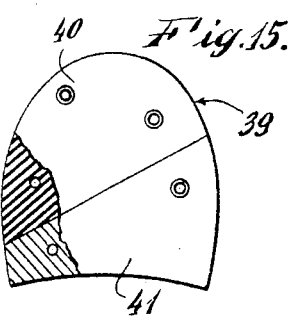
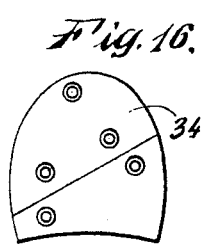
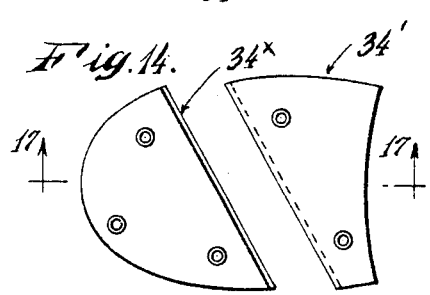
INVENTOR
EZEQUIEL B. CINTRON
BY
Edw. S. Higgins
ATTORNEY.

Patented Aug. 31, 1948

2,448,354

UNITED STATES PATENT OFFICE 2,448,354

MACHINE FOR CUTTING MEN'S HEELS

Ezequiel B. Cintron, New York, N. Y.

Application December 17, 1947, Serial No. 792,200

10 Claims. (Cl. 12—42)

This invention relates to machines for cutting men's leather or rubber heels.

Men's heels usually wear faster at the rear end of the heel and become deformed at this point. It is therefore desirable that a man's heel be mounted on the shoe in two parts so that when one part, for example the rear part, wears or becomes deformed it may be removed and replaced with a similar part in perfect condition which is already in stock.

A prime object is to provide a machine that will make a diagonal cut across the heel.

Another object is to provide such a machine with means whereby various sizes of heels may be selectively supported in operative position for cutting thereon.

A further object is to provide means for cushioning or controlling the movement of the movable feeding carriage of the machine toward the cutter.

Still another object is to provide means for automatically retracting the movable feeding carriage away from the cutters.

Yet another object is to provide such a machine with removable supports for supporting heels of various sizes.

Other objects and advantages of the invention will be apparent from the description thereof to follow taken in connection with the accompanying drawings in which—

Fig. 1 is a top plan view of a machine embodying the present invention, parts being shown in section.

Fig. 2 is a front view thereof.

Fig. 3 is a sectional view taken on the plane of the line 3—3 of Fig. 1 on a reduced scale, with parts omitted.

Fig. 4 is a sectional view taken on the plane of the line 4—4 of Fig. 1.

Fig. 5 is a sectional view taken on the plane of the line 5—5 of Fig. 1.

Fig. 6 is a sectional view taken on the plane of the line 6—6 of Fig. 1.

Fig. 7 is a sectional view taken on the plane of the line 7—7 of Fig. 1, parts being broken away.

Fig. 8 is a fragmentary top plan view showing a rubber heel support in position on the feeding carriage, on an enlarged scale.

Fig. 9 is a fragmentary top plan view of the feeding carriage, on an enlarged scale.

Fig. 10 is a sectional view taken on the plane of the line 10—10 of Fig. 8.

Fig. 11 is a top plan view of a rubber heel after being cut by the machine.

Fig. 12 is a top plan detail view showing the rubber heel support separated.

Fig. 13 is a view similar to Fig. 11 but showing a smaller size rubber heel.

Fig. 14 is top plan view of a rubber heel after it has been cut by the machine, the parts of the heel being separated.

Fig. 15 is a top plan view of a modified form of heel resulting from use of the improved machine.

Fig. 16 is a view similar to Figs. 11 and 13 but showing a rubber heel of a smaller size.

Fig. 17 is a sectional view taken on the plane of the line 17—17 of Fig. 14.

Men's rubber heels of ordinary construction come in at least eleven different sizes and for the purpose of identification are marked as follows ranging from the largest to the smallest size: "14–15," "13–14," "12–13," "11–12," "11–11," "10–11," "10–10," "7–8," "6–6," "5–5" and "4–4." The improved machine is capable of accommodating and cutting all of the foregoing sizes of rubber heels.

Referring to the various views of the drawings, the improved machine comprises a frame 15 of suitable metal having side walls 16, removable front wall 17 and fixed rear wall 18. The top of the frame is open and across the front part thereof is a hinged cover member 17' and across the rear part thereof a hinged cover member 18' suitably latched to the frame.

Extending across the frame near its rear wall is a cylindrical shaft 19 journalled in a center bearing member 20 and end bearing members 21 on the side walls 16. Shaft 19 extends through one of the side walls 16 and is operatively connected to the drive shaft 22 of a motor 23 for driving shaft 19. Firmly fixed on portions 24 of the shaft 19 is a pair of spaced disc-shaped saws or cutters 25 having saw teeth 26.

Slidably supported between the side walls in front of the cutters 25 is a carriage 27 formed of suitable metal, the side edges 28 of which slide on opposed shelves 29 on the side walls 16 and are guided in such movement in grooves 30. A handle 30' is secured to each side of the carriage to facilitate movement thereof. The rearward movement of the carriage toward the cutters 25 is controlled by a pair of coiled tension springs 31, each of which has one end fastened to a stud 16' on one of the side walls 16 and its other end fastened to the bottom of the carriage at its rear edge.

The carriage is formed with a slot 32 running from its rear edge to a point beyond its center, directly in front of each cutter 25. The carriage adjacent each slot 32 on its under surface is enlarged or reinforced as shown at 27' in Fig. 10. On each side of each slot are three pairs of spaced holes 33. Each hole of the outermost pair on each side of the slot 32 is marked, for example, "14-15" to correspond to a size "14-15" rubber heel. Each hole of the intermediate pair is marked "10-11" on each side of the slot 32 to correspond to size "10-11" rubber heel, and each hole of the innermost pair is marked "6-6" to correspond to size "6-6" rubber heel.

Adapted to be removably mounted on the feeding carriage 27 in a pair of holes 33 on each side of the slot 32 is a two-piece support 34 for a rubber heel 34'. The support or platform is formed of suitable metal and each piece thereof has a pair of pins or studs 35 depending from its bottom surface. There is a support for each different size heel, making eleven supports in all to be used with the machine. The support for sizes 14-15, 13-14, 12-13, 11-12 and 11-11 have their pins 35 spaced the same distance apart so that all of these sized supports can fit in the outermost pair of holes marked "14-15." The supports for sizes 10-11, 9-10 and 7-8 have their pins spaced the same distance apart so that all of said sizes fit in the intermediate pair of holes marked "10-11." And the supports for sizes 6-6, 5-5 and 4-4 have their pins 35 spaced the same distance apart so that all of these sizes fit in the innermost pair of holes marked "6-6."

The support 34 comprises a metal block shaped in plan the same as the rubber heel but cut in two by a cut as indicated at 36 thereby providing two separate pieces. The upper surface of the supporting block tapers downwardly and forwardly as shown in Fig. 10. On the piece of the block representing the rear thereof and extending upwardly from its upper surface is a metal plate 37 flanged inwardly, and on the piece of the block representing the front thereof and extending upwardly thereof from its upper surface is a similar flanged plate 38. Plate 37 is curved to conform to the shape of the rear of a rubber heel and plate 38 to conform to the front end of a rubber heel.

In using the machine, a support 34 capable of supporting the size rubber heel it is desired to cut is mounted over each slot 32 in the feeding carriage 27 by placing the pins 35 of said support in the proper pair of openings 33. For example, a support 34 capable of supporting size 14-15 rubber heel is mounted on the carriage by placing the pins 35 of one piece of said support 34 in the pair of openings marked "14-15" on one side of each slot 32 on the carriage and by placing the studs or pins 35 of the other piece of said support in the pair of openings marked "14-15" on the opposite side of each slot, as shown in Figs. 1 and 8. This will position each support 34 at an angle to the inner edge of the feeding carriage 27 and will align the cut in said support with its associated slot 32 as shown in Fig. 8. A one-piece rubber heel of the desired size is placed on its corresponding sized support 34 with its rear and front edges under the flanged plates 37 and 38, respectively. Assuming that the motor is running and the shaft 19 is rotating, the carriage 27 is manually slid along the frame toward the cutters 25 by means of the handles 30' until the cutters come into contact with the one-piece rubber heels on the supports 34 and continued rearward movement of the carriage 27 will cause the cutters to cut through the one-piece rubber heels and inasmuch as the supports are tapered as shown, the rubber heels will be cut in half, with the cut at an angle to the vertical as indicated at 34x in Figs. 14 and 17, or on a diagonal plane, and also at an angle to the axis of the rubber heel as shown in Figs. 14 and 17.

When the rubber heels are completely cut in half by the cutters, if the operator will release the pressure upon the feeding carriage 27, the coiled springs 31 will automatically retract and return the carriage to its forward inoperative position of Fig. 1.

A guard 33' is mounted on the side walls of the frame above the cutters 25 in order to protect the operator.

The hinged cover members 17' and 18' permit inspection and access to the interior of the machine when desired.

The front wall 17 is screwed on and may be removed to permit the carriage to be slid entirely free of the machine when necessary for repairs or otherwise.

In Fig. 11 is shown a rubber heel 34' representing a size capable of being supported in the outermost pair of holes 33 marked "14-15," the heel being shown cut in two.

Figs. 13 and 16 show rubber heels 34' representing sizes capable of being supported in the intermediate pairs of holes marked "10-11," and in the innermost pairs of holes marked "6-6," respectively, the heels being shown cut in two.

In Fig. 15 is shown a two-piece "English" type combined rubber and leather heel, the piece 40 being formed of rubber and the piece 41 being formed of leather. Such a type of heel is capable to being processed by the present invention.

While provision is made for cutting two heels of either rubber or leather of equivalent thickness and size at a time, the machine might be constructed with means for cutting only one heel at a time.

Men's heels cut in two pieces, with the cut at an angle to the vertical as produced by my improved machine makes it possible to market and use leather and rubber heels with replaceable parts so that when one part wears away or becomes deformed, it can easily be replaced by a similar part in perfect condition.

What I claim is:

1. A machine of the kind described comprising a frame, a rotatable shaft supported by said frame, a cutter fixed on said shaft, a manually actuated carriage slidably mounted on the frame and movable to and from the cutter and a heel supporting member on said carriage positioned in the path of the cutter, said heel supporting member having a slot for receiving the cutter.

2. A machine of the kind described comprising a frame, a motor driven shaft supported by said frame, a cutter fixed on said shaft, a manually actuated carriage slidably mounted on the frame and movable to and from the cutter, a heel supporting member on said carriage positioned in the path of the cutter, said heel supporting member having a slot for receiving the cutter, and means on the heel supporting member for detachably supporting heels of various sizes.

3. A machine of the kind described comprising a frame, a motor driven shaft supported by said frame, a cutter fixed on said shaft, a manually actuated carriage slidably mounted on the frame and movable to and from the cutter, a heel supporting member on said carriage positioned in the path of the cutter, said heel supporting member being shaped similar to a heel and having a slot for receiving the cutter and overhanging flanged plates on the heel supporting member for detachably supporting heels of various sizes.

4. A machine of the kind described comprising a frame, a motor driven shaft supported by said frame, a cutter fixed on said shaft, a manually actuated carriage slidably mounted on the frame and movable to and from the cutter, said carriage having a slot extending to and through its edge in alinement with the cutter for receiving said cutter, a heel supporting member on said carriage in the path of the cutter, said heel supporting member having a slot positioned above and in alinement with the slot in the carriage, said heel supporting member having a tapered surface for supporting a rubber heel and plates on the heel supporting member for guiding said rubber heel to position and removably supporting the rubber heel on the heel supporting member.

5. A machine of the kind described comprising a frame, a motor driven shaft supported by said frame, a cutter fixed on said shaft, a manually actuated carriage slidably mounted on the frame and movable to and from the cutter, said carriage having a slot extending to and through the edge in alignment with the cutter for receiving said cutter and a rubber heel supporting member on said carriage positioned in the path of the cutter, said heel supporting member being shaped similar to the rubber heel and having a tapered surface for supporting said rubber heel, said heel supporting member having a slot positioned above and in alignment with the slot in the carriage and flanged plates at the front and rear ends of said heel supporting member for removably supporting the rubber heel on the tapered surface.

6. A machine of the kind described comprising a frame, a motor driven shaft supported by said frame, a cutter fixed on said shaft, a manually actuated carriage slidably mounted on the frame and movable to and from the cutter, said carriage having a slot extending inwardly from one edge thereof in alignment with the cutter and having a pair of holes on each side of said slot, and a removable sectional heel supporting member on the carriage having a slot positioned above and in alignment with the slot in the carriage, each section of said heel supporting member having a pair of depending pins adapted to be inserted in a pair of holes on one side of the slot in the carriage, said heel supporting member having a tapered surface for supporting a rubber heel thereon.

7. A machine of the kind described comprising a frame, a motor driven shaft supported by said frame, a cutter fixed on said shaft, a manually actuated carriage slidably mounted on the frame and movable to and from the cutter, said carriage having a slot extending inwardly from one edge thereof in alignment with the cutter and having a pair of holes on each side of said slot, a removable two-piece heel supporting member on the carriage having a slot positioned above and in alignment with the slot in the carriage and having a tapered upper surface for supporting a rubber heel, each piece of said heel supporting member having a pair of depending pins removably mounted in a pair of holes on one side of the slot in the carriage, and plates on the heel supporting member for guiding the rubber heel to its position on the tapered surface and for retaining said rubber heel in such position.

8. A machine of the kind described comprising a frame, a motor driven shaft supported by said frame, a cutter fixed on said shaft, a manually actuated carriage slidably mounted on the frame and movable to and from the cutter, said carriage having a slot extending inwardly from one edge thereof in alignment with the cutter and having a plurality of pairs of holes on each side of said slot, and a removable two-piece heel supporting member on the carriage having a slot above and in alignment with the slot in the carriage and having a tapered upper surface for supporting a rubber heel thereon, each piece having a pair of depending pins adapted to be selectively and removably mounted in a pair of holes on one side of the slot in the carriage.

9. A machine of the kind described comprising a frame, a motor driven shaft supported by said frame, a pair of spaced cutters fixed on said shaft, a manually actuated carriage slidably mounted on the frame and movable to and from the cutters, said carriage having a slot extending inwardly from one edge thereof in alignment with each cutter and having a plurality of pairs of holes on each side of each slot, a removable two-piece rubber heel supporting member on the carriage above each slot therein, each heel supporting member having a slot in alignment with its respective slot in the carriage and having a tapered upper surface for supporting a rubber heel, each piece of each heel supporting member having a pair of depending pins selectively and removably mounted in one pair of holes on one side of the adjacent slot in the carriage.

10. A machine of the kind described comprising a frame, a motor driven shaft supported by said frame, a pair of spaced cutters fixed on said shaft, a manually actuated carriage slidably mounted on the frame and movable to and from the cutters, said carriage having a slot extending inwardly from one edge thereof in alignment with each cutter and having a plurality of pairs of holes on each side of each slot, a removable two-piece rubber heel supporting member on the carriage above each slot therein, each heel supporting member having a slot in alignment with its respective slot in the carriage and having a tapered upper surface for supporting a rubber heel, each piece of each heel supporting member having a pair of depending pins selectively and removably mounted in one pair of holes on one side of the adjacent slot in the carriage and a flanged plate on each piece extending above its upper surface for guiding a rubber heel into proper position on the heel supporting member and for retaining said rubber heel in proper position thereon.

EZEQUIEL B. CINTRON.